Nov. 29, 1927.

H. L. ASHBY 1,651,310

BREAKING-IN MACHINE

Filed Aug. 9, 1926   2 Sheets-Sheet 1

H. L. Ashby
INVENTOR

BY Victor J. Evans
ATTORNEY

Nov. 29, 1927. 1,651,310
H. L. ASHBY
BREAKING-IN MACHINE
Filed Aug. 9, 1926  2 Sheets-Sheet 2
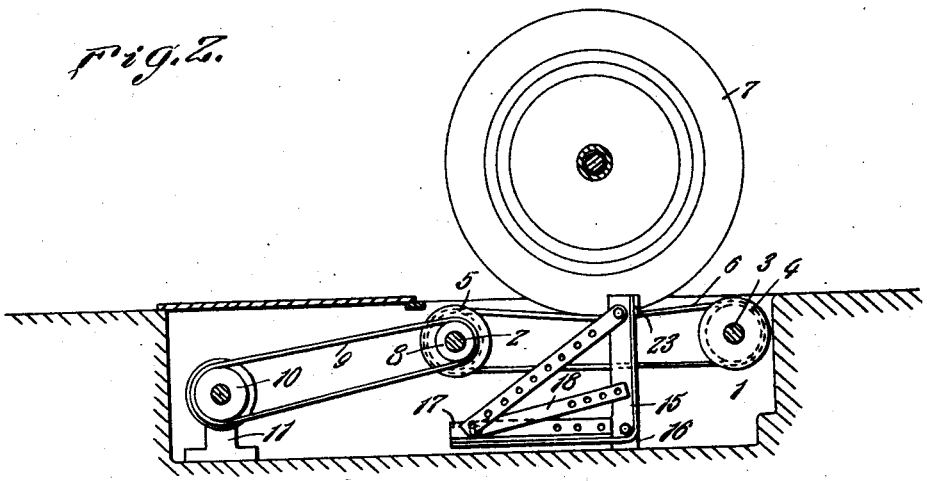
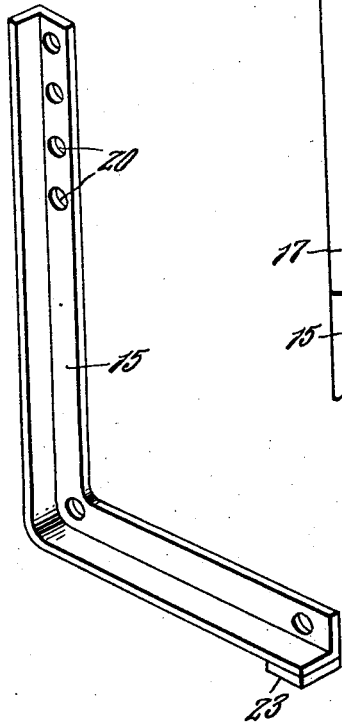
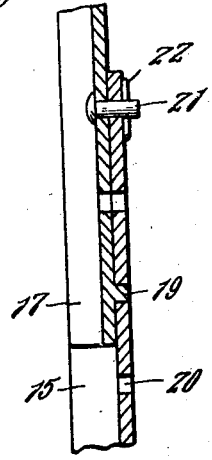
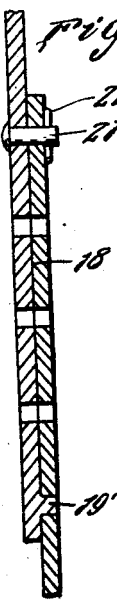
H. L. Ashby
INVENTOR
BY Victor J. Evans
ATTORNEY Patented Nov. 29, 1927.

1,651,310

UNITED STATES PATENT OFFICE.

HEBER L. ASHBY, OF MAMMOTH, UTAH, ASSIGNOR OF ONE-HALF TO JAMES E. CLARK, OF SPANISH FORK, UTAH.

BREAKING-IN MACHINE.

Application filed August 9, 1926. Serial No. 128,205.

This invention relates to a new and improved device for starting automobile engines and is particularly adapted for use in automobile repair shops for starting the engine after the same has been overhauled. It is a well known fact that after an engine of this character has been overhauled it is found that the same is so stiff or the bearings so tight that it can not be started by the ordinary battery or crank and it is therefore generally necessary to take the machine out and tow it a certain distance before it will be loosened up sufficiently to permit starting of the engine.

The main object of my invention is the provision of a device of the above character which can not only be utilized for starting automobile engines after the same has been overhauled so as to save time and expense from the necessary towing of the vehicle, but also to provide means whereby a new automobile engine may be broken in before the same is used to any extent and can be used at factories for breaking in the engine before sending the same out.

A further object of my invention is the provision of an automobile starting device wherein novel means are employed for retaining the automobile against movement relative to the device after the engine of the automobile has been started and additional means are provided whereby to disconnect the driving motor from the device after the engine in the automobile has been started.

With the above and other objects in view the invention consists in the novel features of construction, the combination and arrangement of parts hereinafter more fully set forth, pointed out in the claims and shown in the accompanying drawings, in which:—

Figure 2 is a similar view showing the retaining frame in a folded position.

Figure 4 is a detail perspective view of the main portion of the retaining frame.

Figure 5 is a detail section of the part of the retaining frame, and

Figure 6 is a detail section of another part of the retaining frame.

Figure 1:
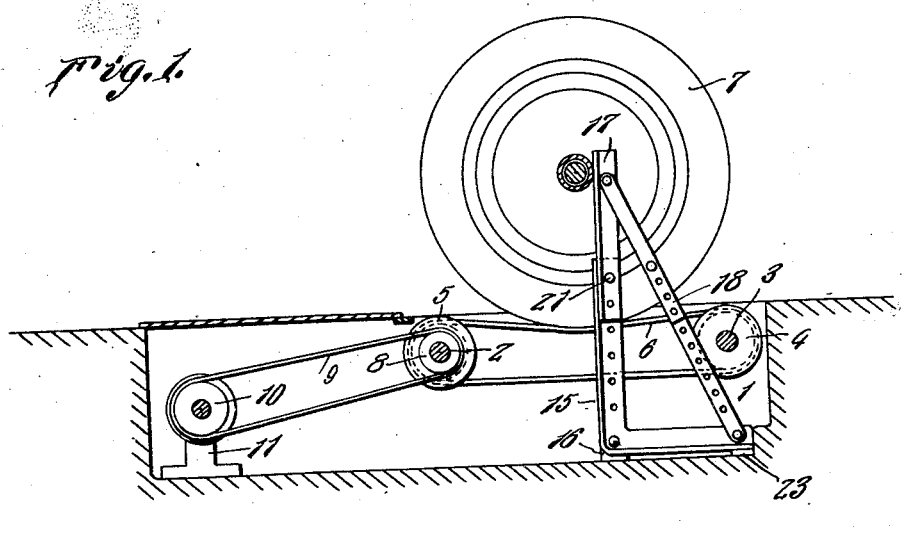
Figure 1 is a detail longitudinal section taken through my improved device showing the same in its operative position.

Referring now more particularly to the drawings it will be noted that my improved device is positioned within a pit 1 which is located in the cement floor of a garage or repair shop and the entire pit itself will be formed with its walls of concrete as illustrated.

Positioned within the pit just below the upper edge thereof are the two parallel shafts 2 and 3, the ends of which are journaled within suitable bearings 4 mounted in the side walls of the pit. These parallel shafts 2 and 3 support thereon adjacent each end pulleys 5, the faces of which are tapered toward the center of each pulley to form an annular cavity in which the belts 6 ride, each belt conforming to the shape of the pulley as shown in Figure 3 so as to provide a substantially trough like belt in which the wheels 7 of the vehicle are positioned.

The shaft 2 is provided in its intermediate portion with a pulley 8 which is connected by means of a belt 9 with a pulley 10, the supporting shaft of which is mounted in the space bearings 11 in the bottom of the pit. One hub of the pulley 10 extends beyond the bearings and is formed with a clutch 12, adapted to cooperate with another clutch face 13, formed on the driving shaft of the motor 14 whereby to connect and disconnect the shaft and the motor.

After the wheels of an automobile have been positioned upon the belts, as shown in Figures 1 and 2, means are provided to retain the wheels 7 upon the belt 6 during their turning movement so as to operate the automobile engine, such means including suitable stops or retaining brackets which are adapted to engage the rear axle of the automobile to retain the same against movement.

Figure 3:
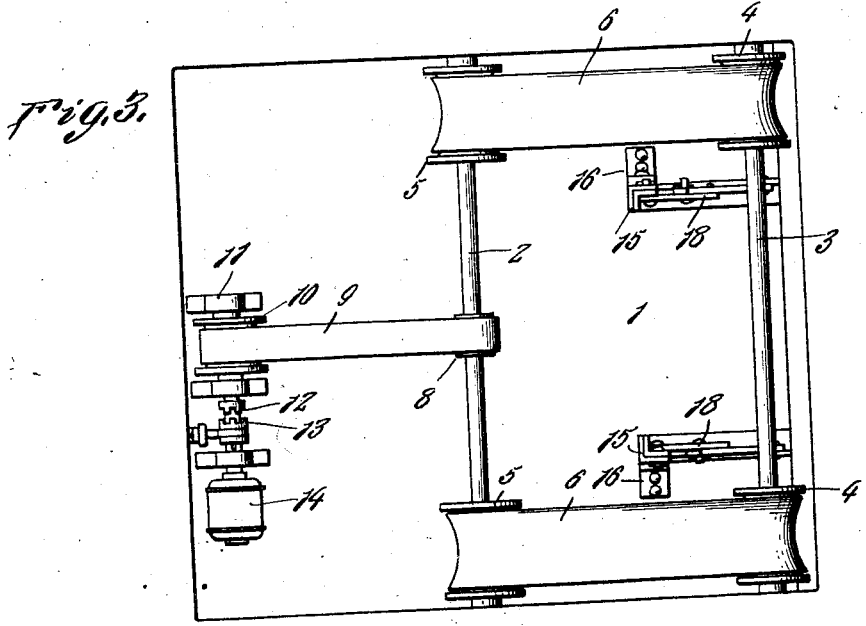
Figure 3 is a top plan view of the device.

The retaining means as illustrated consist of a pair of adjustable stop members, each of which consist of an inner L-shaped member 15 pivoted upon an angular bracket 16 connected to the wall of the pit as shown in Figure 3, and an outer extension 17 adjustably mounted upon one arm of the L-shaped member as shown in Figure 1 and retained in an upright position by means of an adjustable brace 18. One end of the brace is attached to one end of the L-shaped member 15, while the other end is attached to the other extension 17.

As shown in Figure 2 the retaining member is in a folded position and in order to place the same in position for use, the L- shaped member 15 should be positioned with its short arm disposed in a horizontal plane as shown in Figure 1, the overlapping ends of the brace 18 are then connected to retain the extension in an upright position as shown.

The extension 17 is provided at its lower end with an inwardly projecting knob 19 which is adapted to be positioned in any one of the openings 20 formed in one end of the member 15 and in order to retain this extension in position a securing pin 21 is passed through registering openings in the extension 17 and one flange of the member 15 and provided with a cotter pin 22 to retain said pin against movement.

The overlapping ends of the brace 18 are adjustably connected in the same manner as the extension 17 is connected to the member 15. The outer end of the shorter arm of the member 15 is provided with a stop or block 23, which is used for supporting the shorter end of the member 15 in a normally horizontal position.

It will be apparent from the foregoing that in order to start or impart movement to an automobile engine, which has been recently repaired and is so stiff that it is impossible to start the same through the ordinary crank or battery, the rear wheels of the vehicle are positioned upon the two channel shaped belts 6 as shown in Figures 1 and 2 and the motor 14 started, but before starting the motor it is necessary that the retaining members be positioned before the axle of the automobile as shown in Figure 1 to prevent movement of the vehicle upon starting the motor 14. After the motor 14 has been started the clutch faces 12 and 13 may be engaged for imparting movement to the belt 6 and after the automobile engine has been started the clutch faces 12 and 13 may be disengaged and the wheels of the vehicle operated through the engine carried by the same, thus eliminating the necessity of turning over the motor 14 while the engine of the vehicle is running.

It will be apparent from the foregoing that I have provided a comparatively simple device of the character set forth, which can be quickly and readily installed in a cement lined pit of a garage or repair shop and when not in use may be entirely covered by a cover positioned over the same with the edges attached to the sides of the floor.

While I have shown and described the preferred embodiment of my invention, it will be obvious that various changes and alterations may be carried out for reducing the invention to practice without departing from the spirit of the same or the scope of the appended claims.

Having described my invention, what I claim is:—

1. A breaking in device for automobiles comprising spaced parallel movable belts adapted to receive the rear wheels of the automobile, grooved pulleys for said belts, means for imparting movement to the pulleys, angular brackets positioned adjacent each belt, adjustable extensions carried by the angular brackets and adapted for engagement with the automobile for retaining the wheels thereof on the belt, and adjustable brace members having connection with the angular brackets and the extensions, as and for the purpose specified.

2. In a device of the character described, spaced retaining members including angular brackets mounted for pivotal movement, extensions for said brackets adjustably connected to one flange of each bracket and adjustable brace members having one end connected to the angular bracket and the other end connected to the extension.

In testimony whereof I affix my signature.

HEBER L. ASHBY.